United States Patent [19]
Brigden

[11] Patent Number: 5,601,161
[45] Date of Patent: Feb. 11, 1997

[54] SNUBBER BRAKE ASSEMBLY

[76] Inventor: Alex Brigden, Bay 4, 101 Spears Road, Quesnel B.C., Canada, V2J 4Z3

[21] Appl. No.: 412,333

[22] Filed: Mar. 31, 1995

[51] Int. Cl.⁶ .............................. F16F 7/04; B66C 13/06
[52] U.S. Cl. ........................... 188/83; 294/119.4
[58] Field of Search ................ 188/72.7, 73.2, 188/83, 130, 196 D, 196, 335, 343; 192/111 A; 294/86.4, 119.4; 403/113, 120; 414/626, 732–735, 738–740

[56] References Cited

U.S. PATENT DOCUMENTS

| | | | |
|---|---|---|---|
| 3,592,503 | 7/1971 | Lundberg | 294/86 R |
| 3,708,039 | 1/1973 | Germer | 188/62 |
| 4,066,153 | 1/1978 | Plentz | 188/196 |
| 4,335,914 | 6/1982 | Korbel | 188/83 |
| 4,417,759 | 11/1983 | Pierrot, III et al. | 294/119.4 |
| 4,572,567 | 2/1986 | Johnson | 188/83 |
| 4,573,728 | 3/1986 | Johnson | 188/83 |
| 4,690,262 | 9/1987 | Hoyle | 192/111 A |
| 4,715,641 | 12/1987 | Palmer | 188/83 |
| 4,717,191 | 1/1988 | Farmer | 294/119.4 |
| 4,779,711 | 10/1988 | Fahbro et al. | 188/196 D |
| 4,784,245 | 11/1988 | Fahbro et al. | 188/196 D |
| 4,810,020 | 3/1989 | Powell | 294/119.4 |
| 5,451,087 | 9/1995 | Beaulieu | 188/83 |

FOREIGN PATENT DOCUMENTS

| | | |
|---|---|---|
| 894632 | 3/1972 | Canada . |
| 1229108 | 11/1987 | Canada . |
| 2052616 | 4/1992 | Canada . |

*Primary Examiner*—Matthew C. Graham
*Assistant Examiner*—Chris Schwartz
*Attorney, Agent, or Firm*—Lynn & Lynn

[57] ABSTRACT

A snubber brake assembly is disclosed for use with suspended, swingable bodies such as logging machine grapples. The assembly includes a pair of pivot pins extending normal to one another and each supporting brake elements which can be adjusted and the brake members of which can be replaced and adjusted without removing the pivot pins or the grapple from the mechanism suspending the grapple. The assembly includes a saddle plate that straddles the pivot pin and which can be removed from the pin without disassembling the whole unit. The removal of the saddle plate provides for shifting of the other components on the pivot pin to remove and replace brake members therein.

9 Claims, 21 Drawing Sheets

SHOWS SWINGING MOTION OF GRAPPLE HEAD

SNUBBER BRAKE ASSEMBLY

FIELD OF THE INVENTION

This invention relates to brake assemblies and specifically to a snubber brake assembly for use on devices such as grapples used on logging machines.

BACKGROUND OF THE INVENTION

There has been a need for an effective snubber brake for use with suspended, swinging bodies such as grapples suspended from the rear sections of logging skidders and like vehicles. Grapple heads are in wide use in the logging industry and are normally suspended from an arch boom on the rear of the vehicle by means of a universal pivot joint which allows the grapple to be rotated and swung in all directions. Because logging vehicles operate over extremely rough terrain, grapple heads can, without proper restraint, swing around violently and possibly strike the vehicle to which it is connected, and/or damage itself and the vehicle as well. Accordingly, some form of restraint or braking means is needed to keep movement of the grapple head in check.

Snubber brakes of various types for grapple heads have been known for some time. Conventionally, a snubber brake is constantly applied to the moveable members of the apparatus. The tension that the brake is set to is crucial because too much tension will not allow the grapple head to swing properly to the ground but too little tension will result in the grapple head swinging excessively.

Several of the serious problems with conventional brake arrangements is that they are usually complicated and expensive to manufacture and they often require special equipment for adjustment and repair. More often than not, a grapple head must be removed from the arch boom on a logging vehicle to make the brake mechanisms accessible to the operator. This results in expensive down time. Brake maintenance can also be dangerous because removing the mechanism that connects a grapple to a boom or snubber link can sometimes result in the grapple head falling and causing severe injury to an operator repairing the brake.

A grapple head can weigh anywhere from 800 to 3000 pounds so the result of such a piece of equipment falling can be of serious concern indeed for an operator. In the rugged environment logging skidders or like vehicles are working, there is normally no crane available to hook a grapple nor a boom to support the head. A repair crew or operator must jury-rig some form of prop or support system using unsafe methods.

Examples of some prior art in this field may be found in Canadian Patents 1,229,108 issued Nov. 10, 1987; 894,632 issued Mar. 7, 1972; Canadian Laid-open Patent Application 2,052,616 published Apr. 4, 1992 and the following United States patents:

| | |
|---|---|
| 4,572,567 | February 25, 1986 |
| 3,592,503 | July 13, 1971 |
| 4,717,191 | January 5, 1988 |
| 4,715,641 | December 29, 1987. |

SUMMARY OF THE INVENTION

The snubber brake assembly of the present invention provides a unit that is efficient, relatively inexpensive to manufacture, simple and safe to work on and is easy and quick to repair. The brake assembly is sufficiently simple enough to maintain that an equipment operator can adjust and repair the brake with tools that he normally has in his tool box on the vehicle. Significantly, the snubber brake assembly according to the invention has brake shoes or shells with wear surfaces that are accessible to the operator/repairman for adjustment and replacement without having to remove the grapple head from the arch boom of the vehicle. Normally, this would be impossible as the only way to access a conventional snubber's brake wear surface is to remove the grapple head pin, which attaches the grapple to the arch boom. However, by providing a braking wear surface which is removable from the assembly without dismantling the latter, these surfaces can be serviced without dropping the grapple from the arch boom.

The above features make the maintenance of the brake very efficient, relatively effortless and, above all, safe to work on. Safety stems from the fact that the operator does not have to remove the pin that connects the grapple to the boom or the snubber link so that there is no fear of the grapple head falling and crushing a person servicing the brake assembly.

According to a broad aspect, the invention relates to a snubber brake assembly for use with suspended, swingable bodies such as a logging machine grapple the assembly includes two pairs of spaced, parallel lugs, one of the lug pairs constituting an upper pair and being directed away from the other, lower pair thereof. Each pair of lugs supports a brake subassembly with an operative axis of each subassembly being normal to the other subassembly. Each subassembly has its components coaxially located on a shaft or pin extending through the lugs and include inner and outer brake housing having matching, frusto-conical tapered surfaces. Brake shoes are located intermediate the inner and outer housings and means on the pivot shaft are provided for applying compressive force to the housings and the brake shoes therebetween, including a saddle plate removably mounted on the shaft and adjusting means associated with the saddle plate for applying axial, compressive pressure on the housings and brake shoes to inhibit pivotal movement of the components supported by said lugs. The saddle plate and said brake shoes are formed so as to be removable from the shaft without dismantling the complete brake subassembly and whereby the removal of the saddle plate provides for shifting of the other components of the subassembly to remove and replace the brake shoes.

While this specification describes a snubber brake assembly having two pairs of lugs with a pivot shaft extending through each pair and a subassembly mounted on each shaft, it will be appreciated that a snubber with only one pair of lugs and one shaft and brake sub-assembly is within the realm of this invention.

BRIEF DESCRIPTION OF THE DRAWINGS

The invention is illustrated by way of example in the accompanying drawings in which.

DESCRIPTION OF THE PREFERRD EMBODIMENTS

Figure 1:
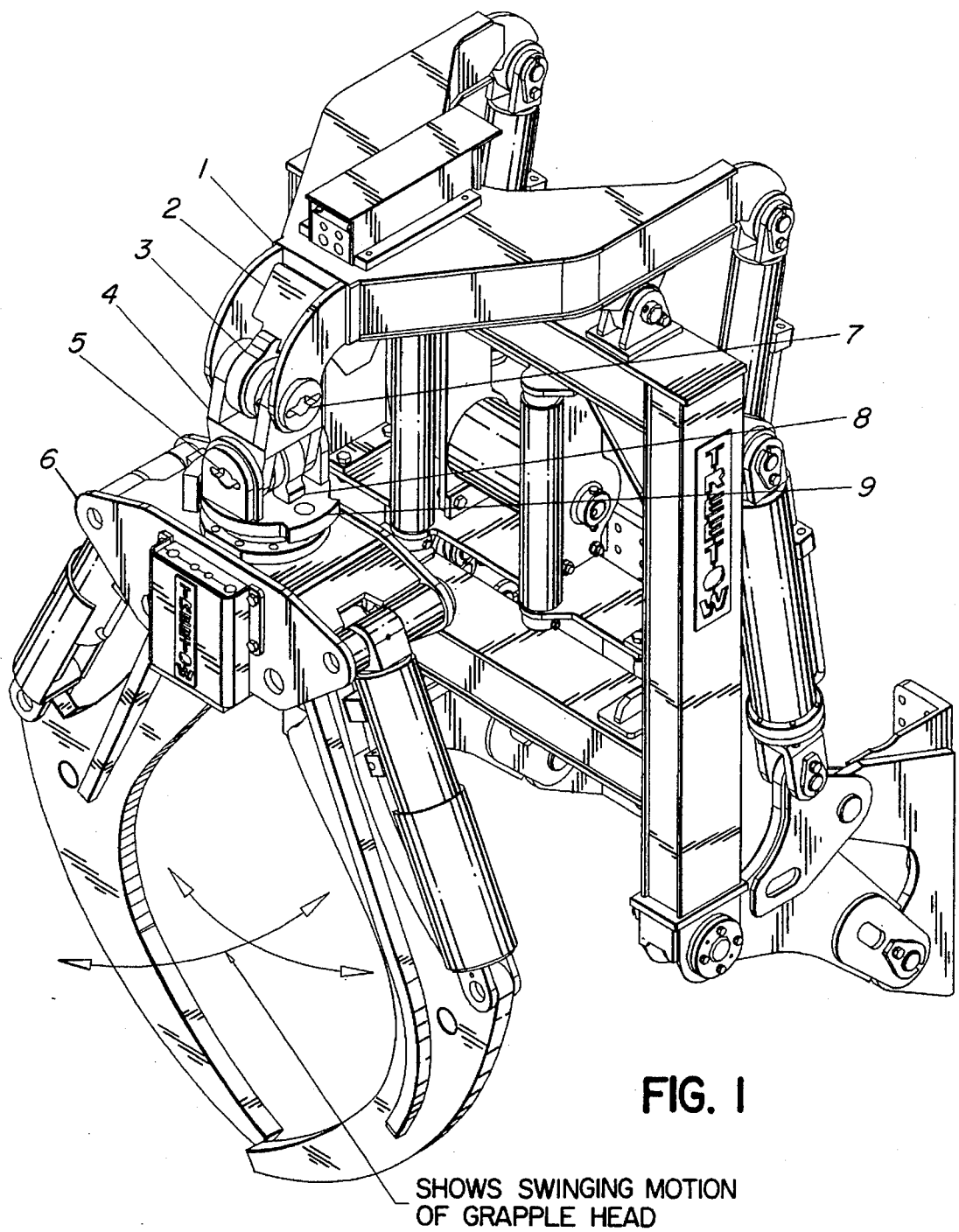
FIG. 1 is a perspective view of a grapple suspended from an arch of a logging machine and utilizing a snubber brake assembly according to the invention.
Figure 2:
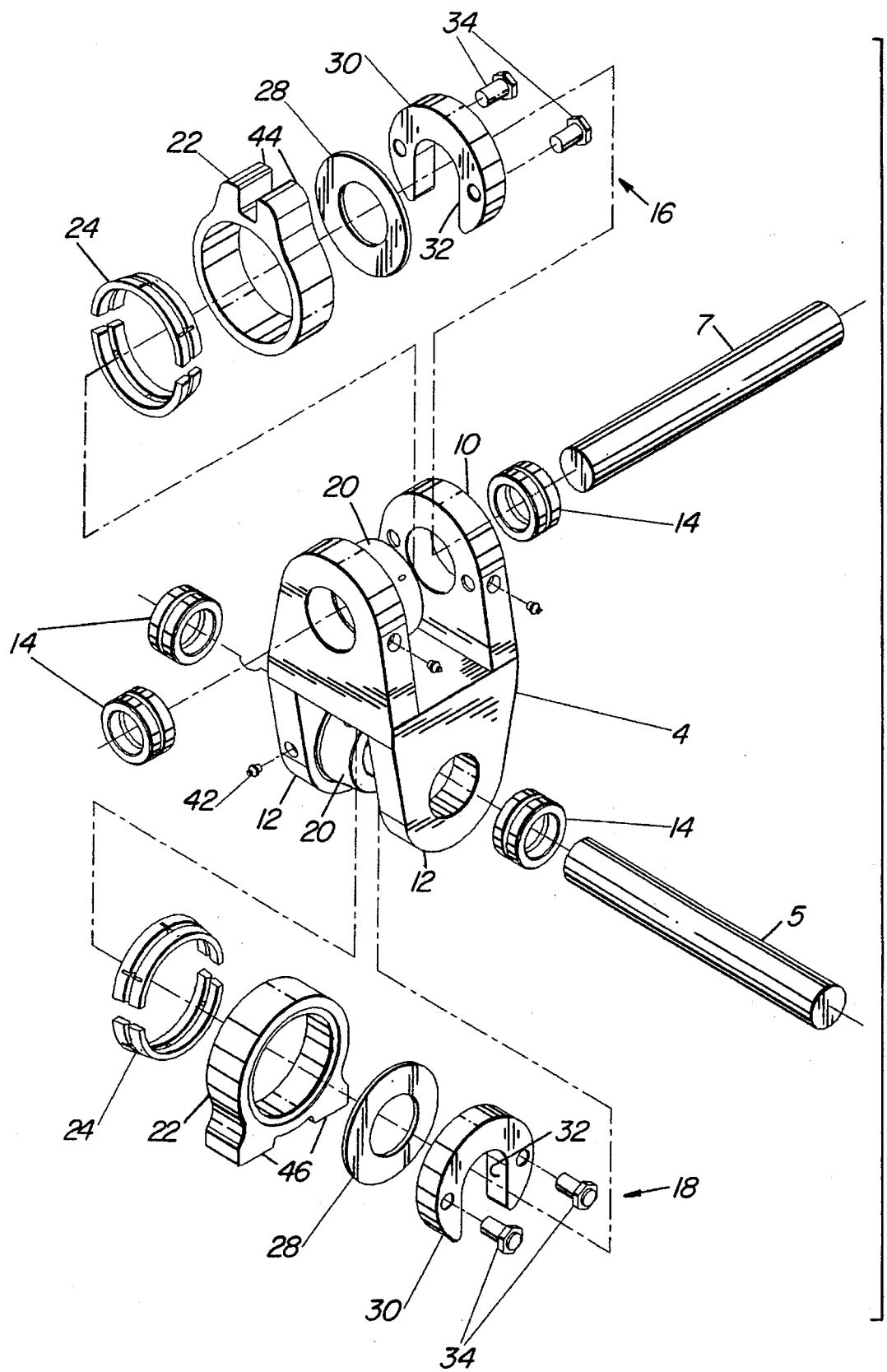
FIG. 2 is an isometric, exploded view of the assembly showing its individual elements.
Figure 3:
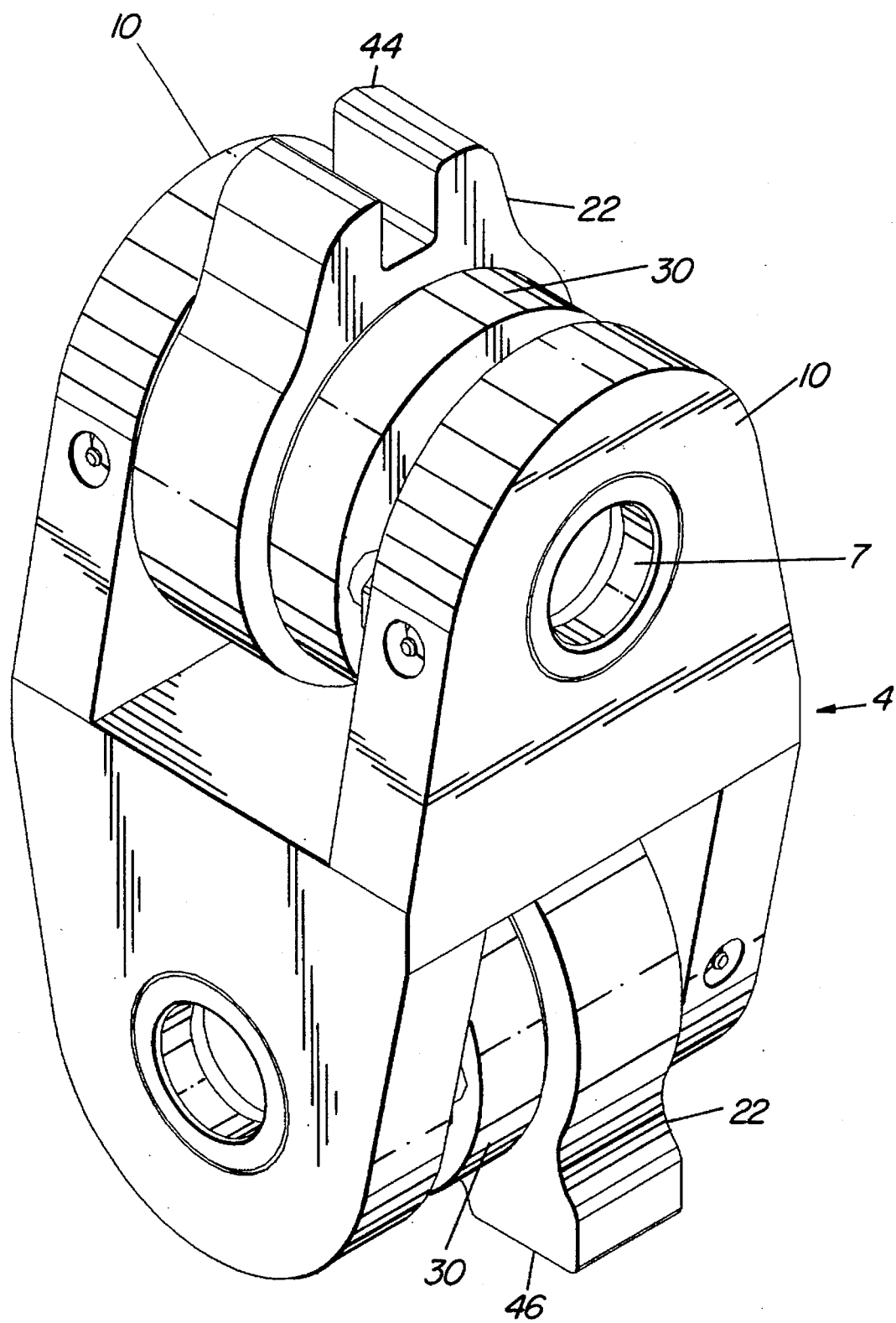
FIG. 3 is one perspective view of the brake assembly.

Referring to FIGS. 1 through 7 which illustrate one embodiment of the invention, and initially to FIGS. 1 and 2, the invention is shown in FIG. 1 interconnecting a swingable grapple head to a boom mounted on an arch on the rear end of a logging skidder or similar vehicle, not shown. The invention comprises a brake assembly link 4 being connected at one of its end to the boom 1 by mean of an upper pivot shaft 7 and, its lower end, to a grapple head by means of a second pivot shaft 5. This allows the grapple head, which rotates about its plate 9, to swing in one direction about the lower pivot shaft 5 and, about another direction, on the upper pivot shaft 7.

As previously described, some form of braking means is needed between the grapple and the link components that suspend it from the boom to keep the grapple head from swinging uncontrollably and possibly striking the vehicle to which it is connected and either damaging the vehicle, itself or both. The brake means is always applied and the tension to which it is set is crucial because too much tension will not allow the head to swing easily to the ground and too little tension will result in the grapple head swinging uncontrollably.

The snubber brake assembly and its individual components are shown in the exploded view of FIG. 2.

The brake assembly link 4 has, in this instance, two pairs of spaced lugs, an upper pair 10 and a lower pair 12. The upper pair of lugs 10 are directed away from and set at right angles with respect to the lower lugs 12. The upper lugs 10 are drilled to receive the upper pivot shaft 7 and the lower lugs 32 are drilled to receive the lower pivot shaft 5, each shaft being mounted in the lugs by means of pin bushings 14. The upper lugs 10 and pivot shaft 7 support an upper brake subassembly indicated generally at 16 and the lower pivot shaft 5 and lugs 12 support a lower brake subassembly 18.

Figure 7:
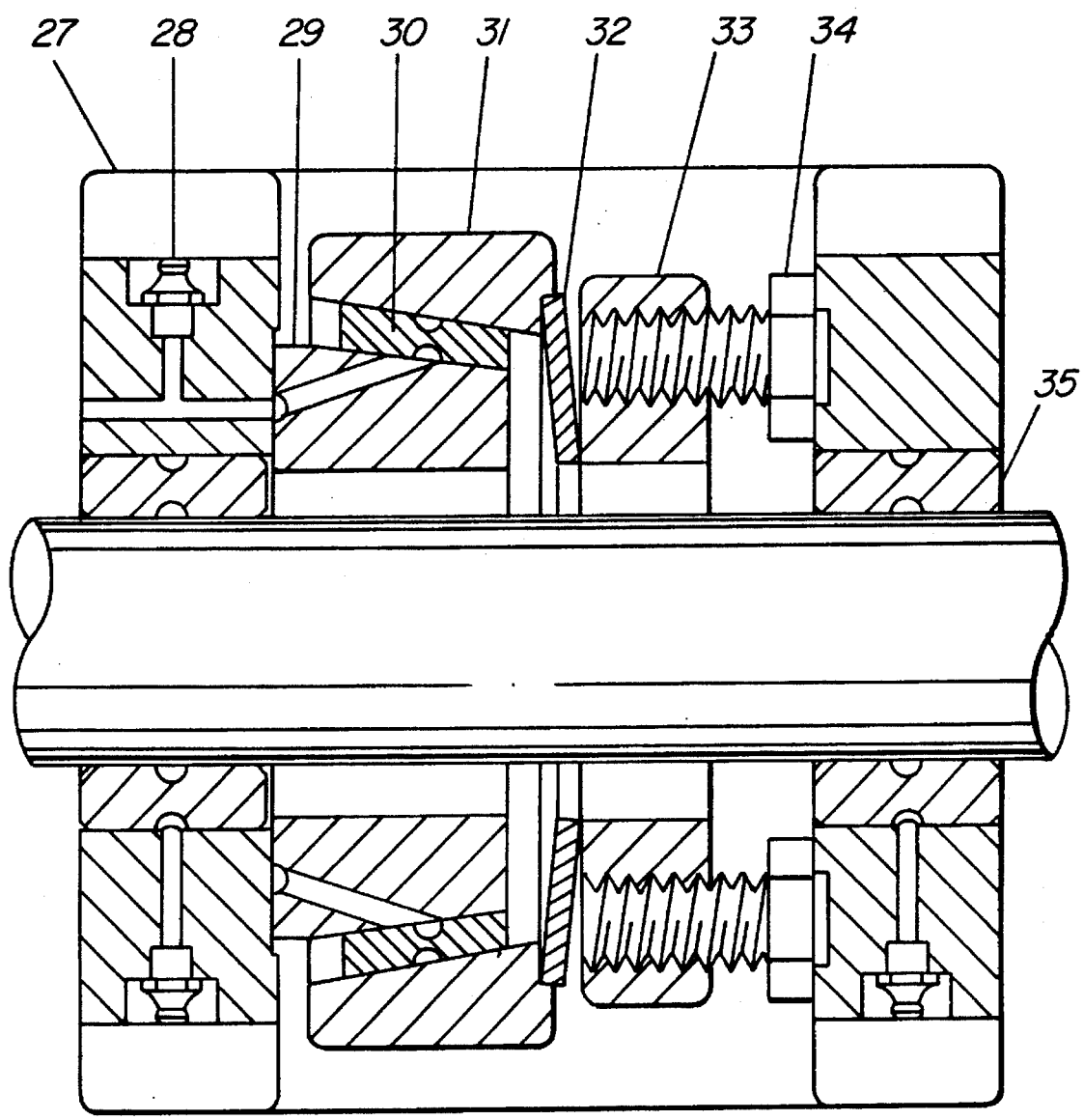
FIG. 7 is a sectional view taken along the line 7—7 of FIG. 4.

Looking at FIG. 2 in combination with FIG. 7, which shows sectional view of one of the brake assemblies, it will be seen that each brake assembly has its components coaxially mounted on its associated pivot shaft and, taking the upper brake assembly as an example, the components comprise an inner brake housing 20, an outer brake housing 22, and pair of brake shoes 24 located intermediate the inner and outer brake housing 20 and 22 as illustrated clearly in FIG. 7, the outer housing 22 having a peripheral groove 26 therein to receive the peripheral rim of a sprung, bevel washer 28.

A saddle plate 30 has an open, U-shaped inner surface 32 which allows the plate to straddle the pivot shaft 7 (or pivot shaft 5) and to be removed from the shaft without dismantling the complete subassembly. As shown in FIG. 7, saddle plate 30 bears against the outer bowed portion of the bevel washer 28 and is maintained in that position by adjusting means in the form of a pair of adjusting bolts 34 each of which has a threaded portion 36 engaging a threaded aperture in the saddle plate 30, the other end of each bolt having a head portion that is recessed into sockets 38 in one of the lugs 10. Each bolt carries an adjusting nut 40, which, when turned, moves the saddle plate toward or away from the bevel washer 28 thereby applying adjustable, compressing force to the inner and outer brake housings 20, 22 and the brake shoes 24 therebetween.

Suitable lubrication may be applied to the subassembly by means of grease nipples 42 located as illustrated.

It will be seen from FIGS. 1 and 2 that the outer brake housing 22 located on the upper shaft 7 has a pair of outwardly extending lugs 44 that engage a stopper plate 2 on the boom 1 and this prevents the brake housing 22 from rotating. Similarly, the lower brake housing 22 on shaft 5 has a pair of spaced, flat feet 46 and these engage the planar surface of the flat stopper plate 9 on the grapple head thereby preventing the lower outer brake housing from rotating.

It will be understood from the illustration of FIG. 7 that, in this embodiment, adjusting the length of the bolts 34 applies pressure in the form of a compressing force on the brake shoes 24 between the juxtaposed surfaces of the inner brake housing 20 which is welded to the lugs 10 and the moveable outer brake housing 22 being forced against the outer surface of the brake shoe by the bevel washer 28 and guide plate 30. In this embodiment, the outer surface of the brake shoe 24 matches the inner taper of the outer brake housing 22. With the two tapered surfaces of the brake housings being directed towards one another, it is assured that the brake shoes 24 will stay in position. This allows the two, semicircular brake hoes 24 to float and not be fixed to either the inner or outer brake housings 20 or 22.

The amount of brake applied is of course related to the amount of force that the adjuster bolts 34 create when they are lengthened or shortened. With the bolts 34 turned out as in FIG. 7, the saddle plate, bevel washer and outer brake housing are all moved toward the inner housing 20. This causes the brake shoes to be squeezed between the inner and outer brake housings. When the brake shoes wear, the bevel washer 28 keeps pressure on the shoes so that constant adjustment is not needed. The brake hoe 24 are lubricated with suitable grease or oil to minimize wear and the lubricant does not hinder the performance of the brake.

The bottom brake subassembly shown in FIG. 2 works in the same fashion as the upper brake assembly, the only difference being that the bottom brake assembly outer housing 22 has the addition of the flat bottom feet 46.

Maintenance and Adjustment

Figure 4:
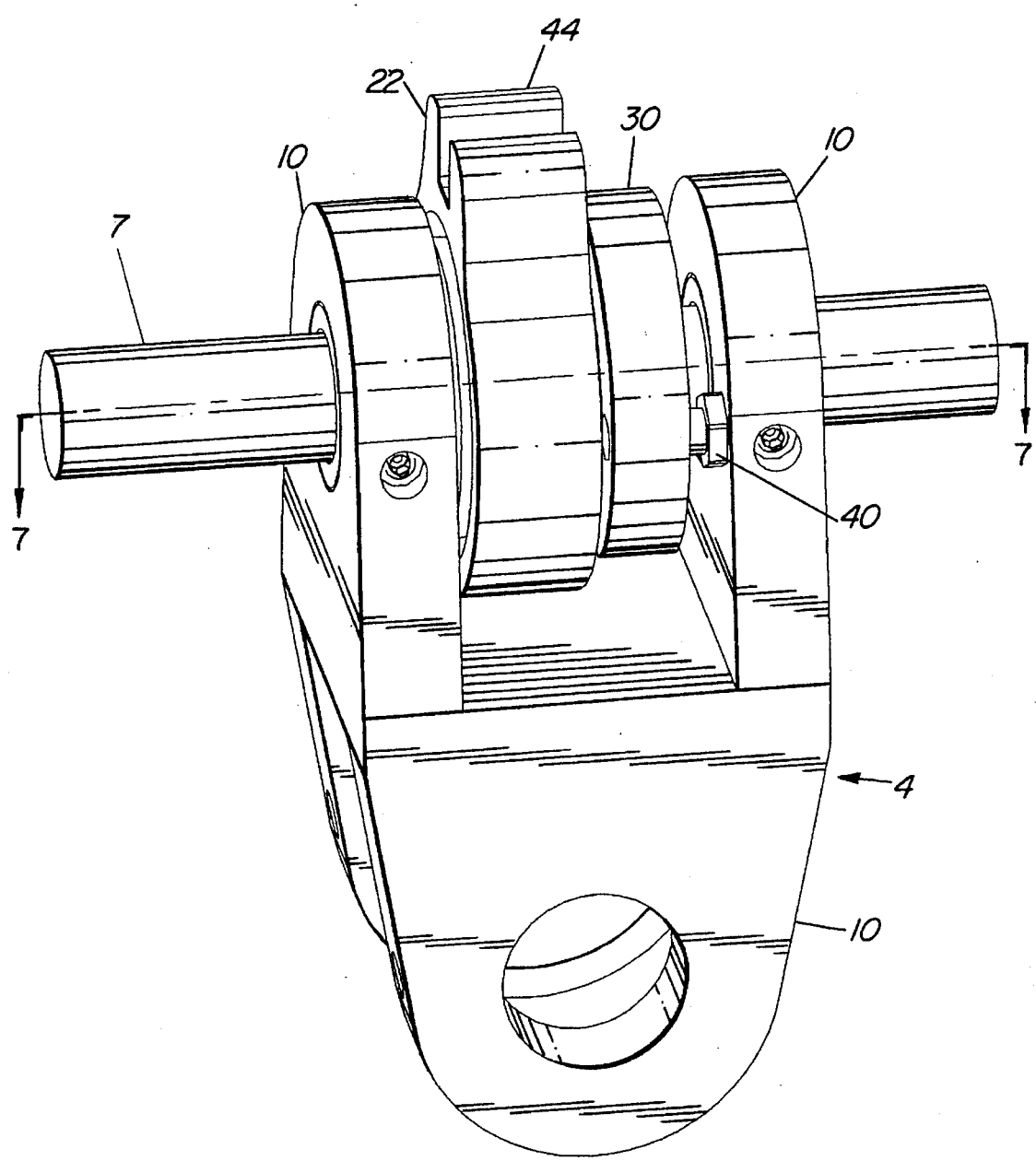
FIG. 4 is a further perspective view of the brake assembly.
Figure 5:
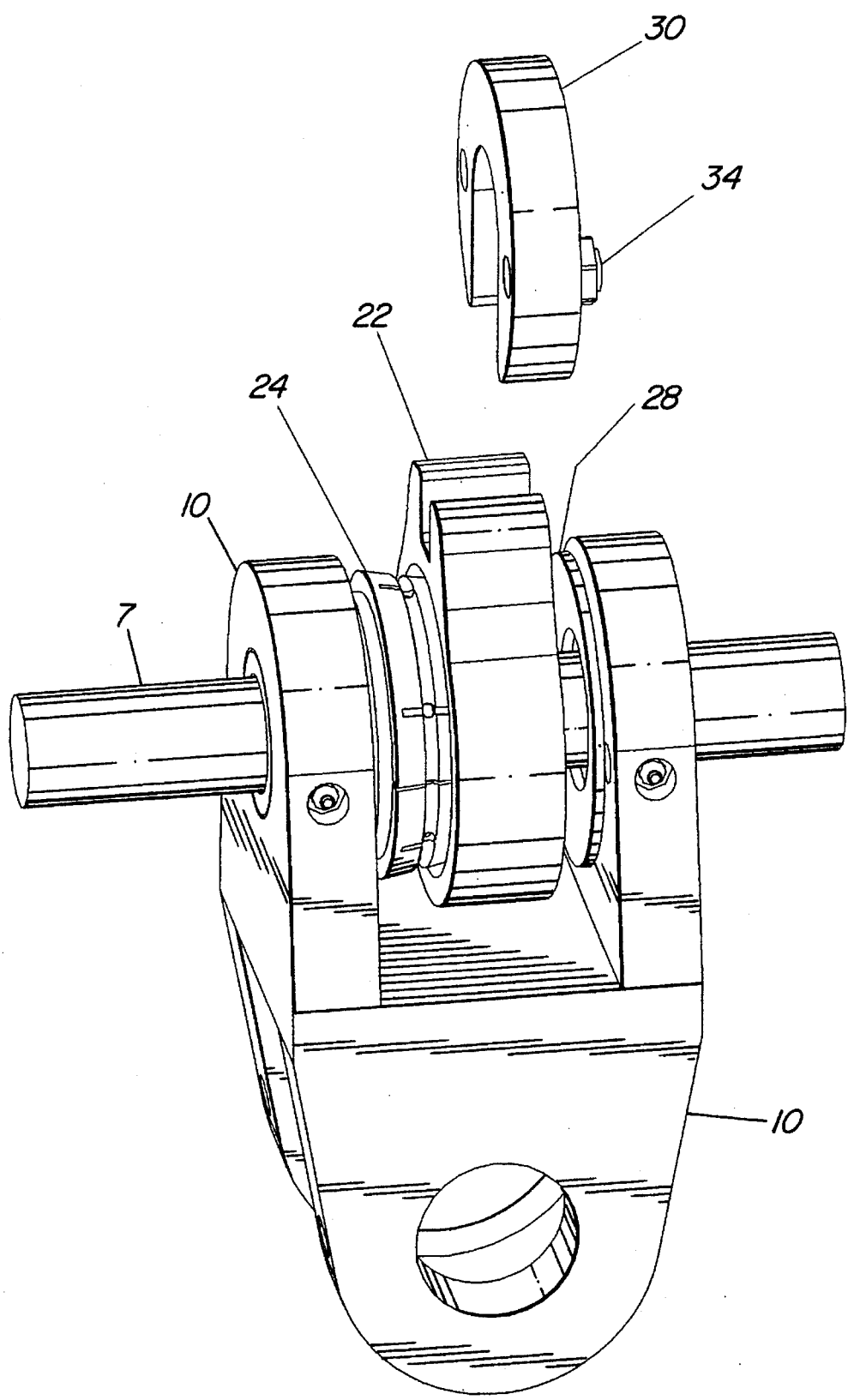
FIGS. 5 and 6 are perspective views of a subassembly, similar to FIG. 4, but illustrating features of adjustment and repair.
Figure 6:
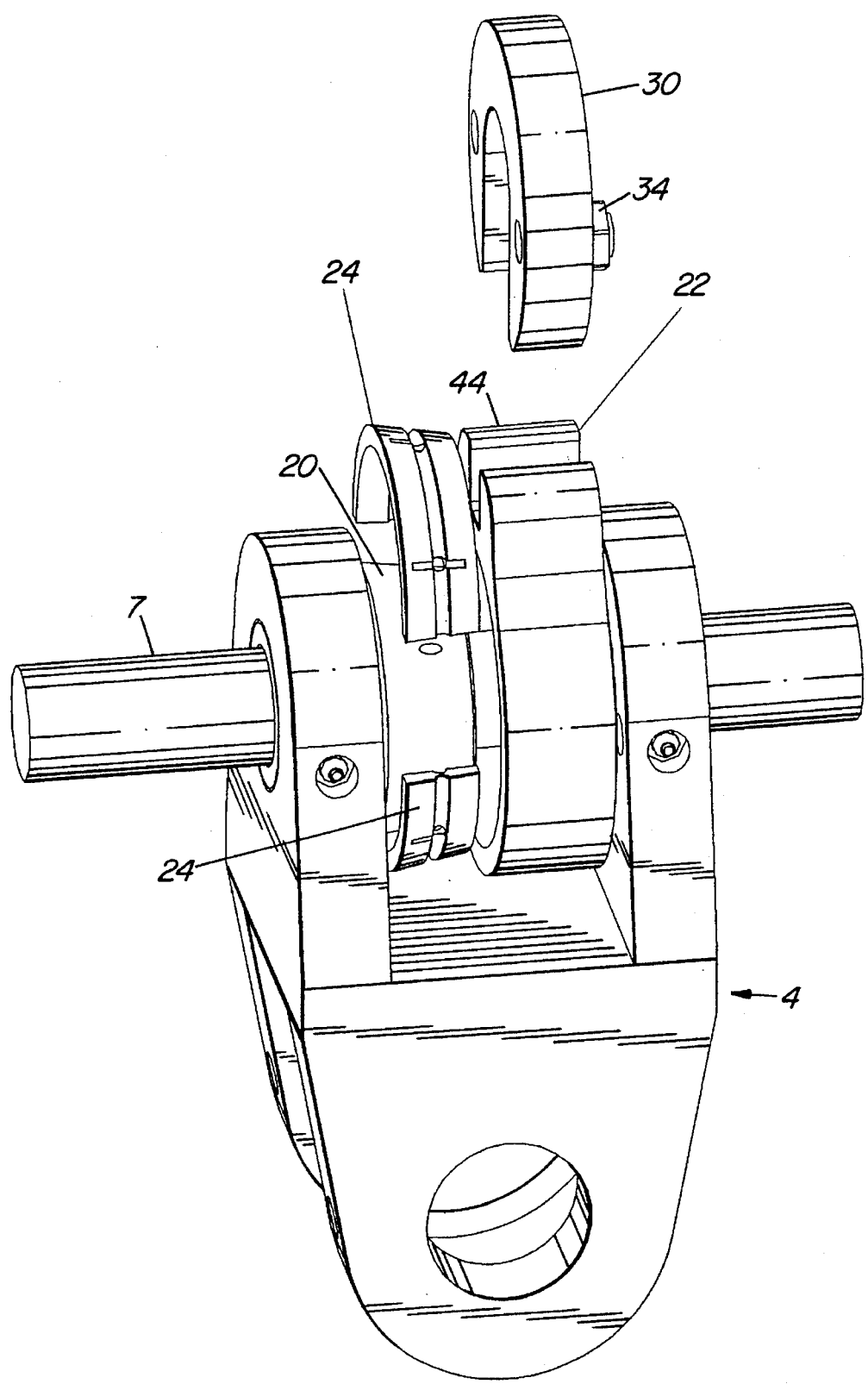

FIGS. 4, 5 and 6 illustrate the manner in which the brake shoes 24 may be replaced without the operator having to remove the grapple from the vehicle. The adjusting bolts 34 are turned into the saddle plate 30 and due to its configuration, plate 30 is then removable from the shaft 7 as shown in FIG. 5. This horseshoe-shaped plate 30 is important to the function of the brake subassembly in as much as its configuration allows it to be removed with the pivot shaft 7 still in place. The operator then moves the outer brake housing 22 and its associated bevel washer 28 over to one side to expose the brake shoes 24 as shown in FIG. 5.

With the outer brake housing 22 and the bevel washer shifted over to the right as in FIG. 5, the operator can then remove the brake shoes as shown in FIG. 6 from the inner brake housing 20. New brake shoes are then installed on the housing 20 and the outer housing 22 is then shifted over to engage the inner taper of the brake shoes on the inner housing. The bevel washer is then shifted over until it makes contact with the outer housing 22, the saddle plate 30 is replaced on the shaft 7 and the adjuster bolts 34 are turned out to force the saddle plate up against the bevel washer 28, until the desired frictional force is obtained.

The down time for replacing shoes in accordance with the present invention is extremely small compared to convention arrangements. Procedures have shown that using a wrench to loosen and tighten the adjusting bolts 34 and the replace the brake shoes can be accomplished in as little as ten minutes. It is important to note that the shafts 7 and 5 joining the grapple head to the boom and to the brake snubber link 4, have not been removed so that the job can be done at any time.

FIGS. 8–14

Turning now to the embodiment of the invention illustrated in FIGS. 8–14, the snubber brake assembly interconnects the grapple with the boom in the same manner as in FIG. 1. However, the brake subassemblies are different in that the brake shoes are retained on the inner brake housing from rotation.

Figure 8:
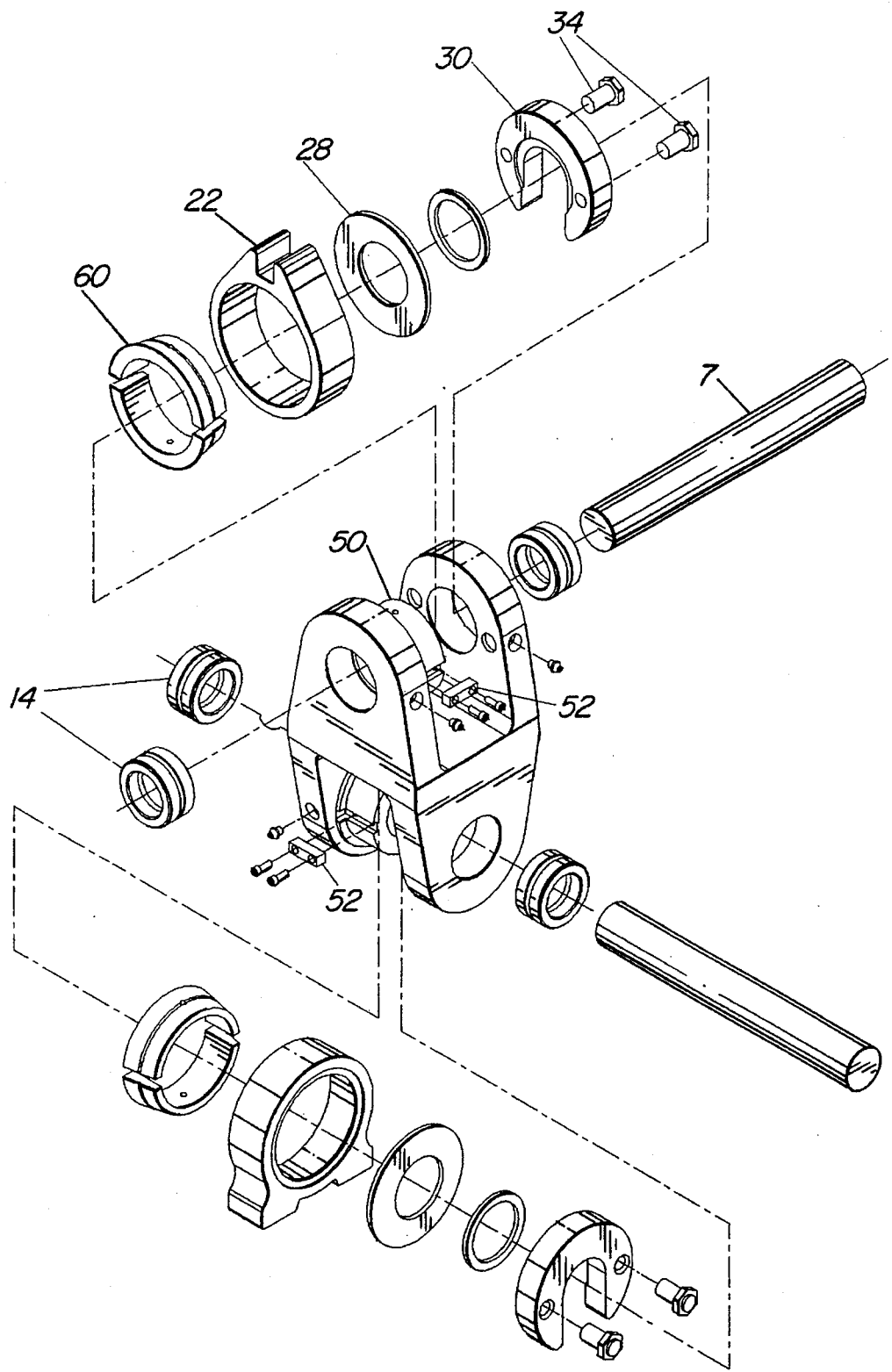
FIG. 8 is an exploded, isometric view showing the elements of the assembly of the second embodiment.
Figure 9:
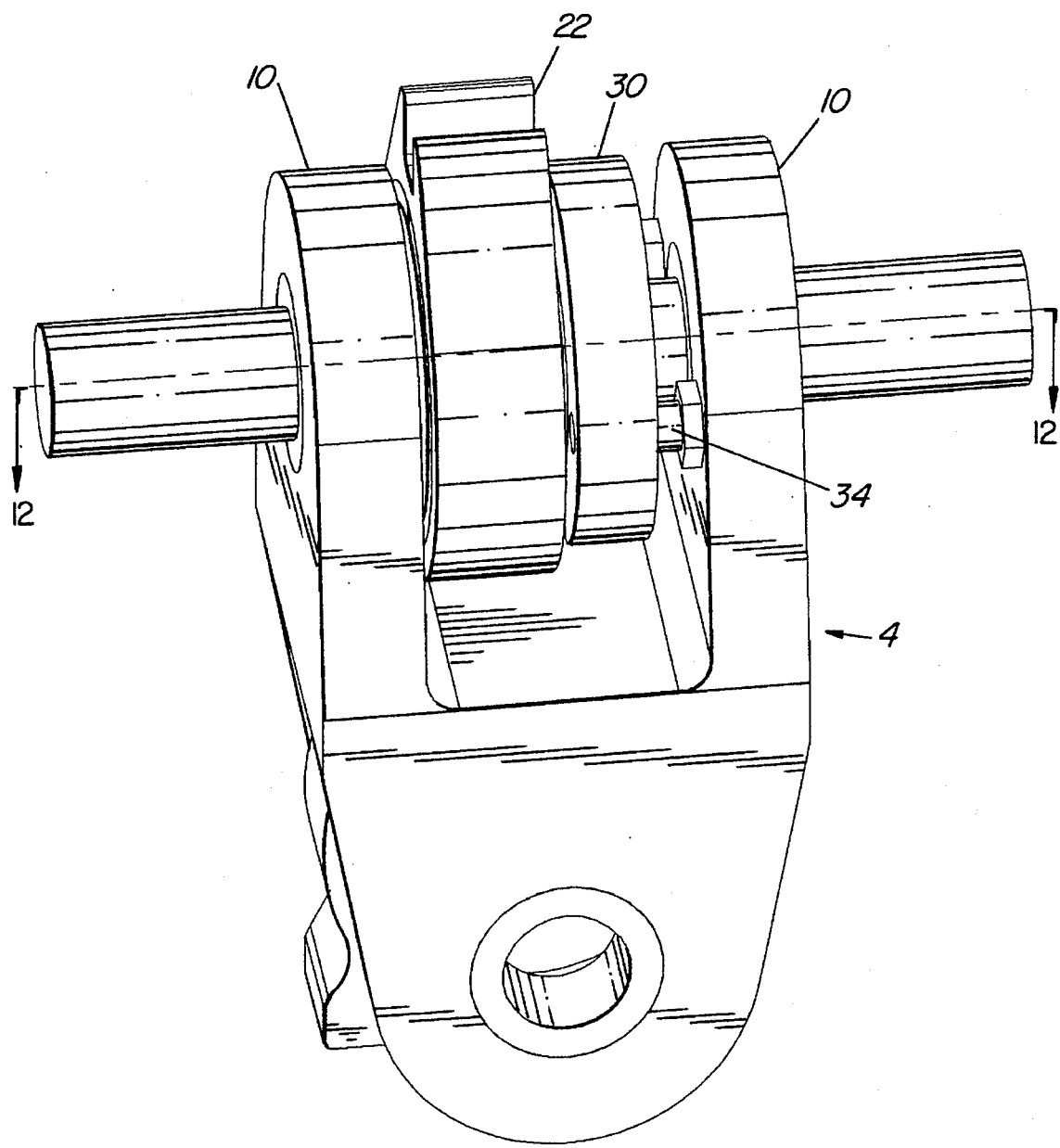
FIG. 9 is a perspective view, similar to FIG. 4, of a further embodiment of the invention.
Figure 12:
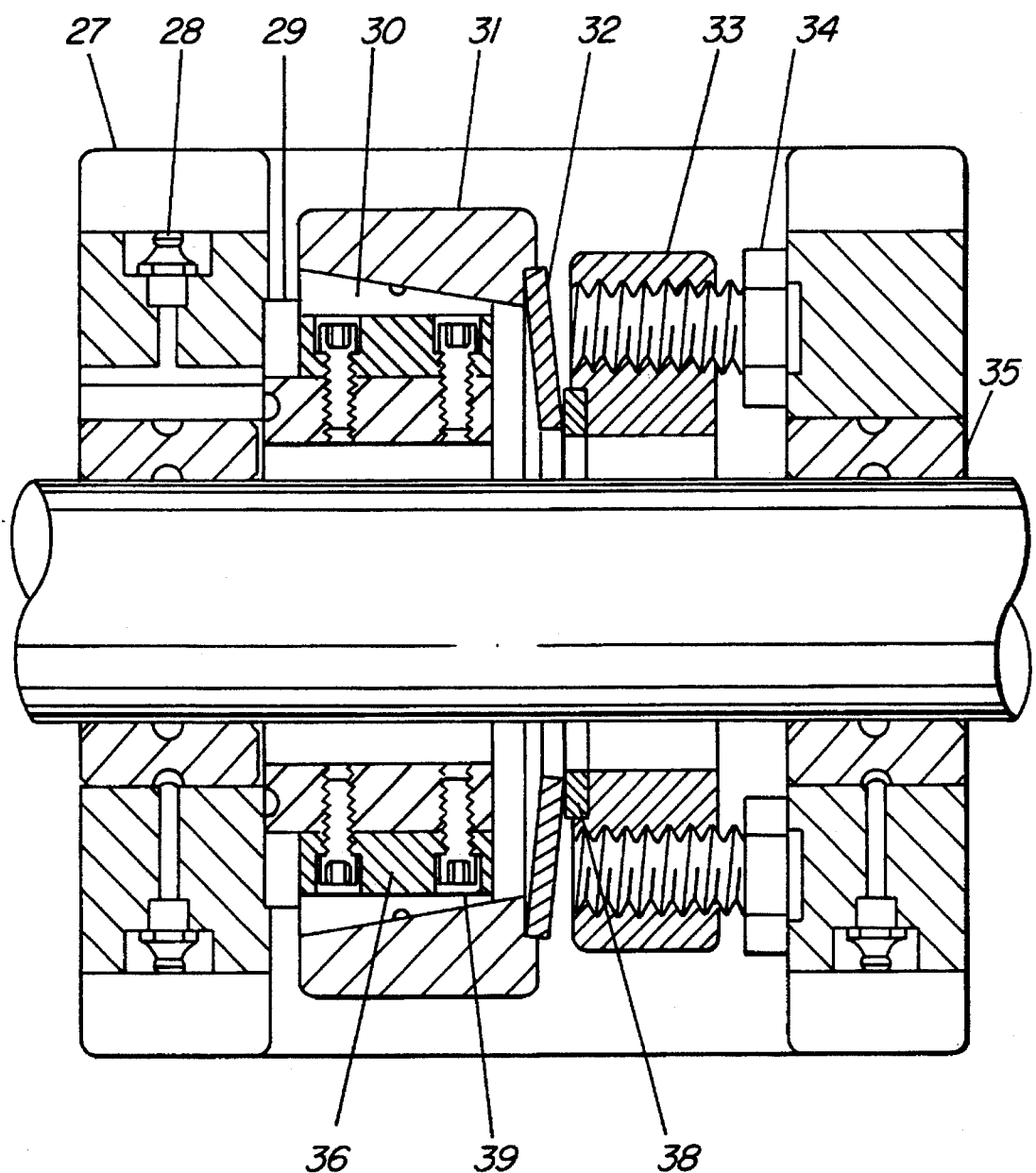
FIG. 12 is a sectional view taken along the lines 12—12 of FIG. 9.
Figure 13:
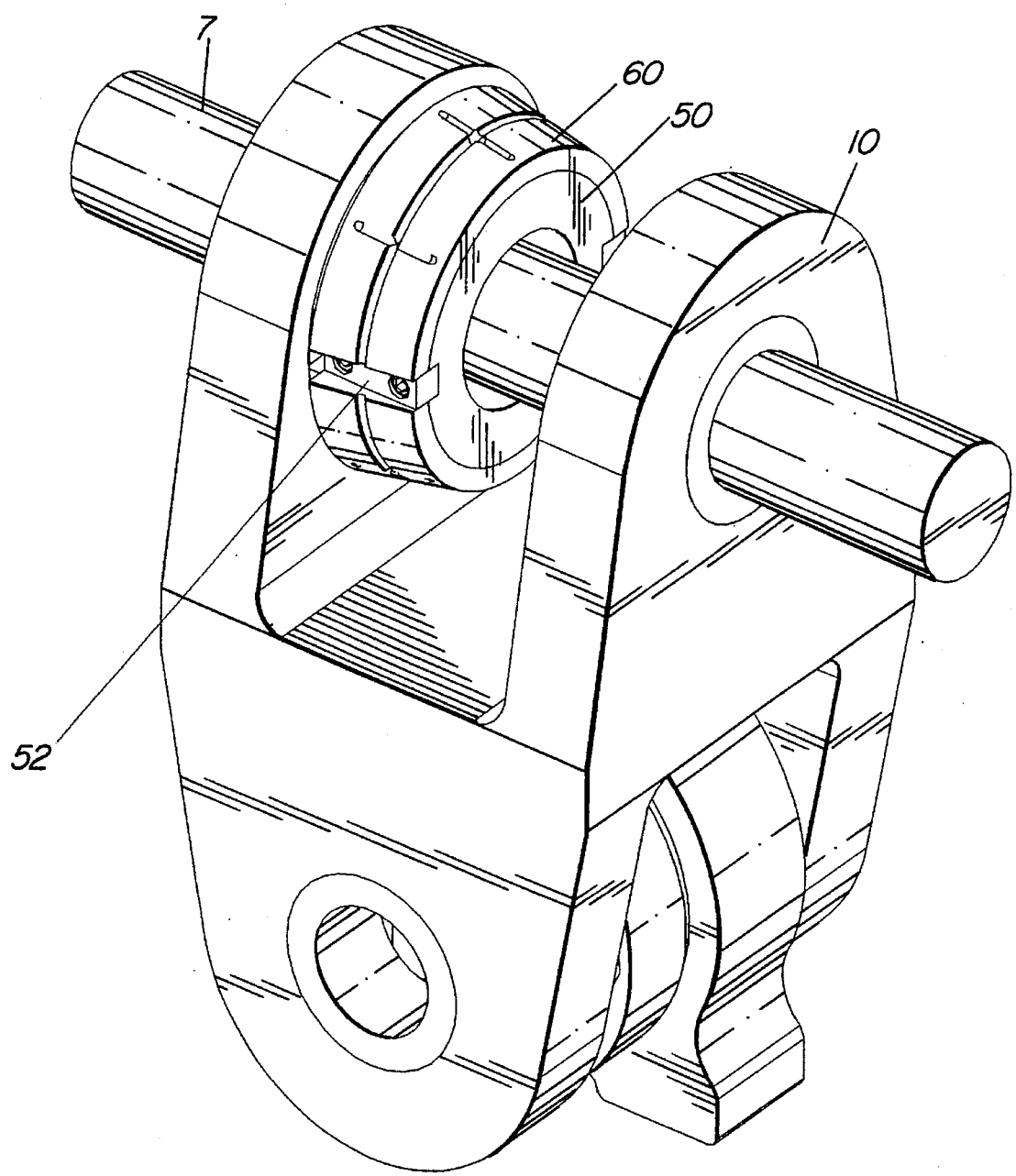
FIG. 13 is a further perspective view of the assembly showing the brake shoes.

In FIG. 8 and 12 it will be seen that the inner brake housing 50 has two key stocks 52 (FIG. 12) held in a keyway 54 with retainer bolts or screws 56. Key stocks 52 are used to keep the brake shoes 60 from turning on the inner brake housing 50 when the brake is in effect. The outer surface of the brake shoe 60 as in the earlier embodiment, matches the inner taper of the outer brake housing 22. With the tapers on the brake shoes and the inner brake housing facing one another, it is assured that the brake shoes will be held in position between the key stocks 52 and up against the back shoulder 66 on the inner brake housing 50. This allows the two piece brake shoes to restrict the outer brake housing from turning freely.

Adjusting the brake is carried out in a similar manner to that in the first embodiment illustrated in FIGS. 1 through 7.

Figure 10:
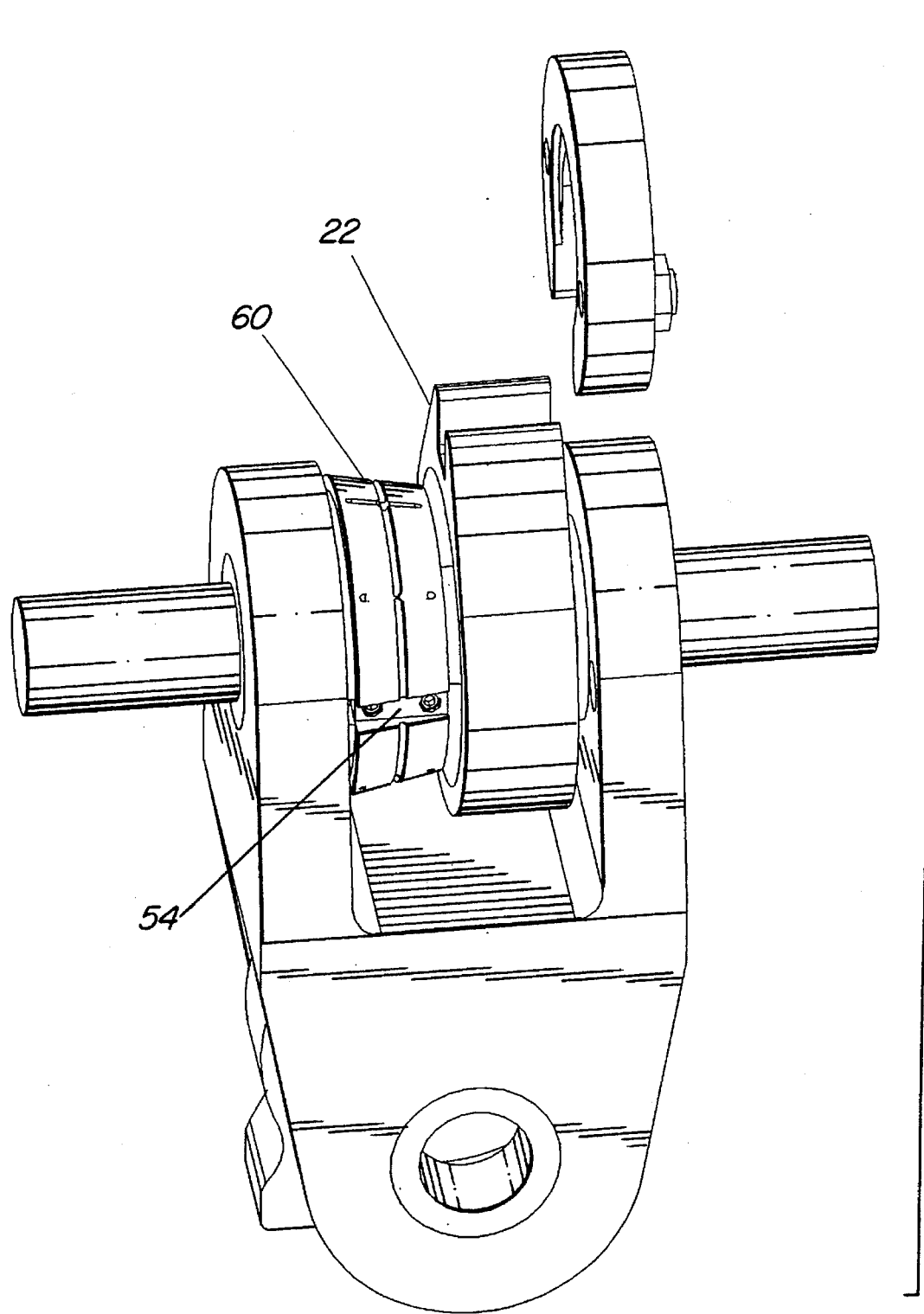
FIGS. 10 and 11 are perspective views, similar to FIGS. 5 and 6, showing features of adjustment and repair of this embodiment.
Figure 11:
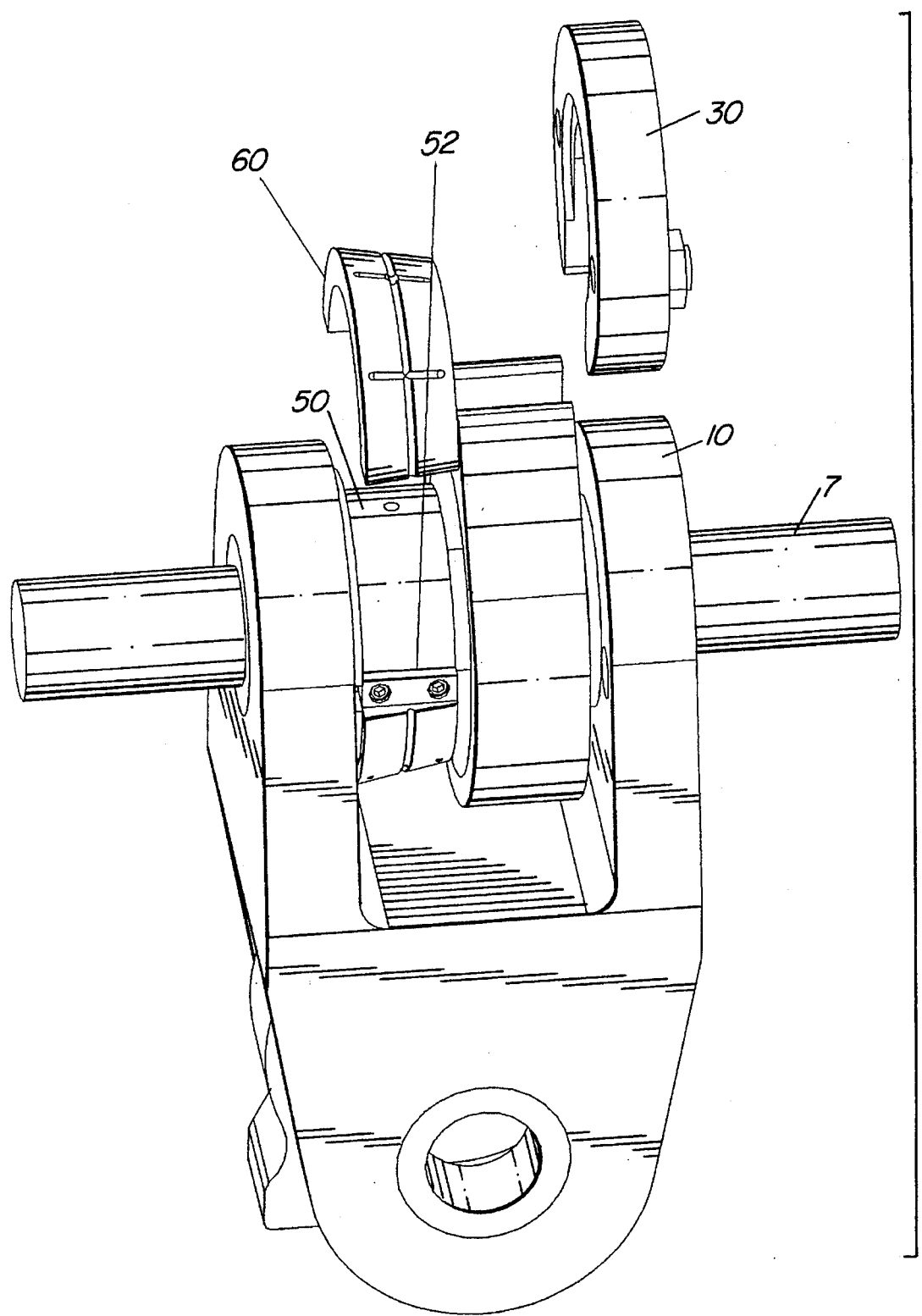
Figure 14:
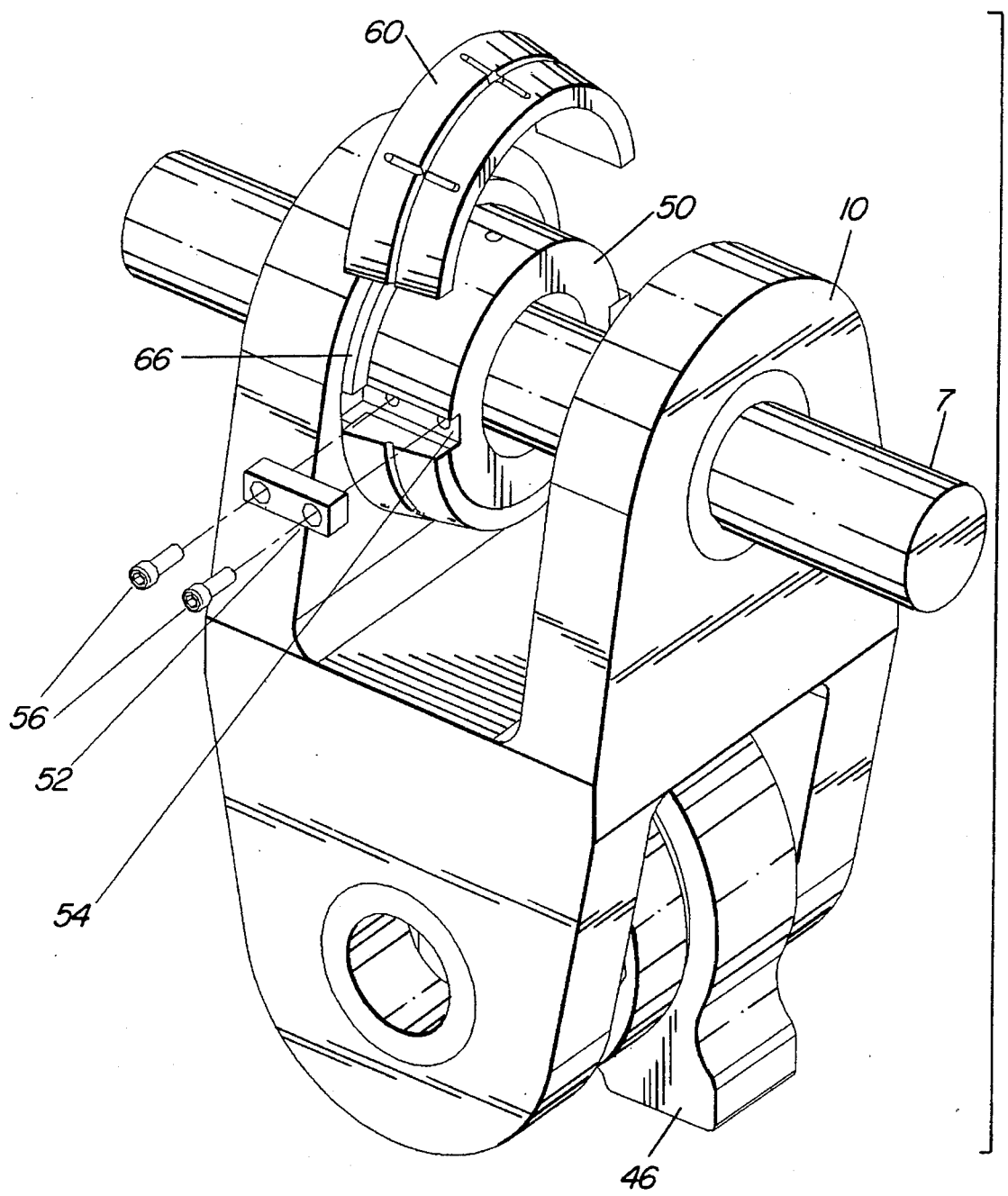
FIG. 14 is a perspective view similar to FIG. 13 but showing portions of the brake in an exploded position.
Figure 15:
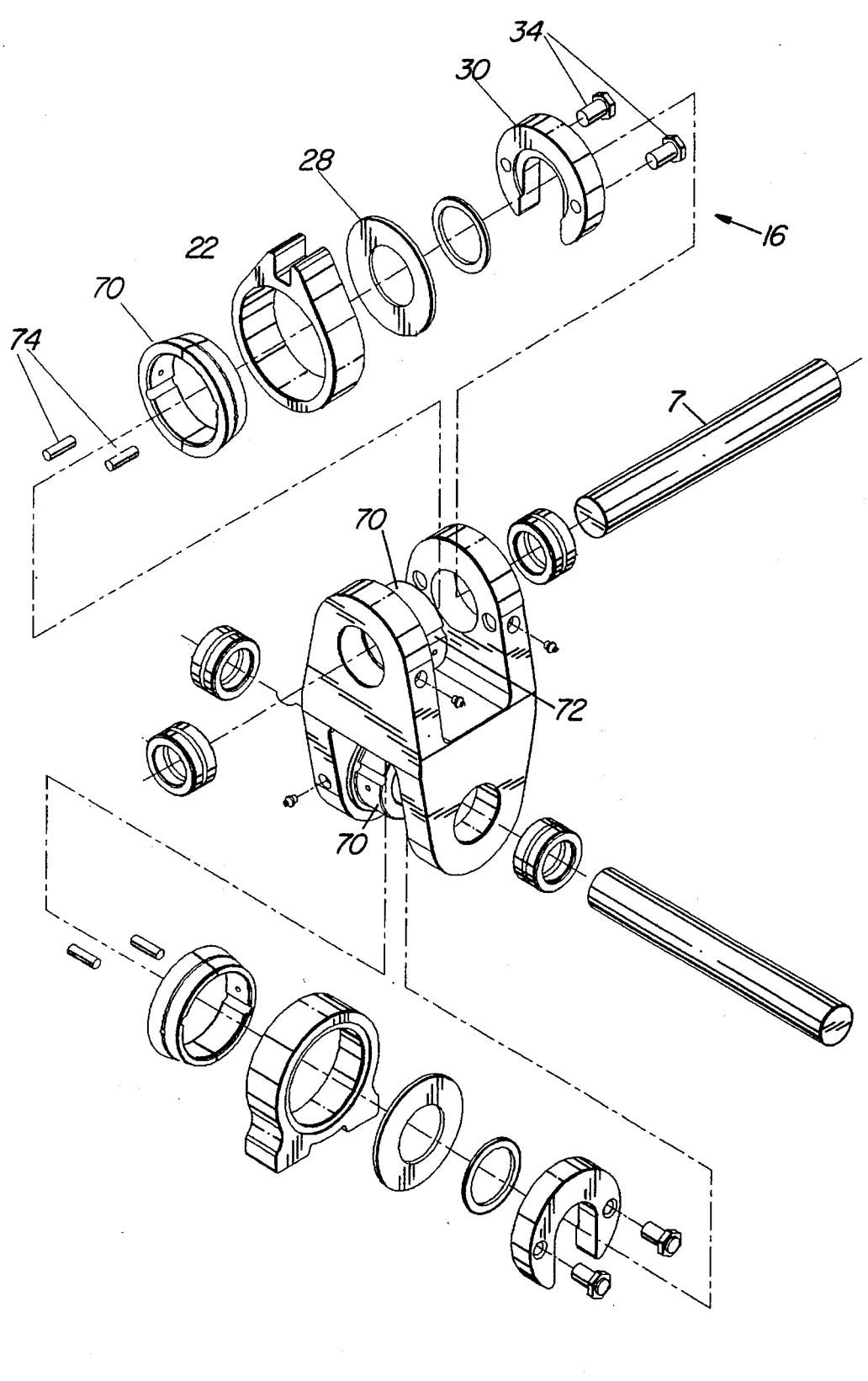
FIG. 15 is an exploded isometric view of a third embodiment of the invention.
Figure 16:
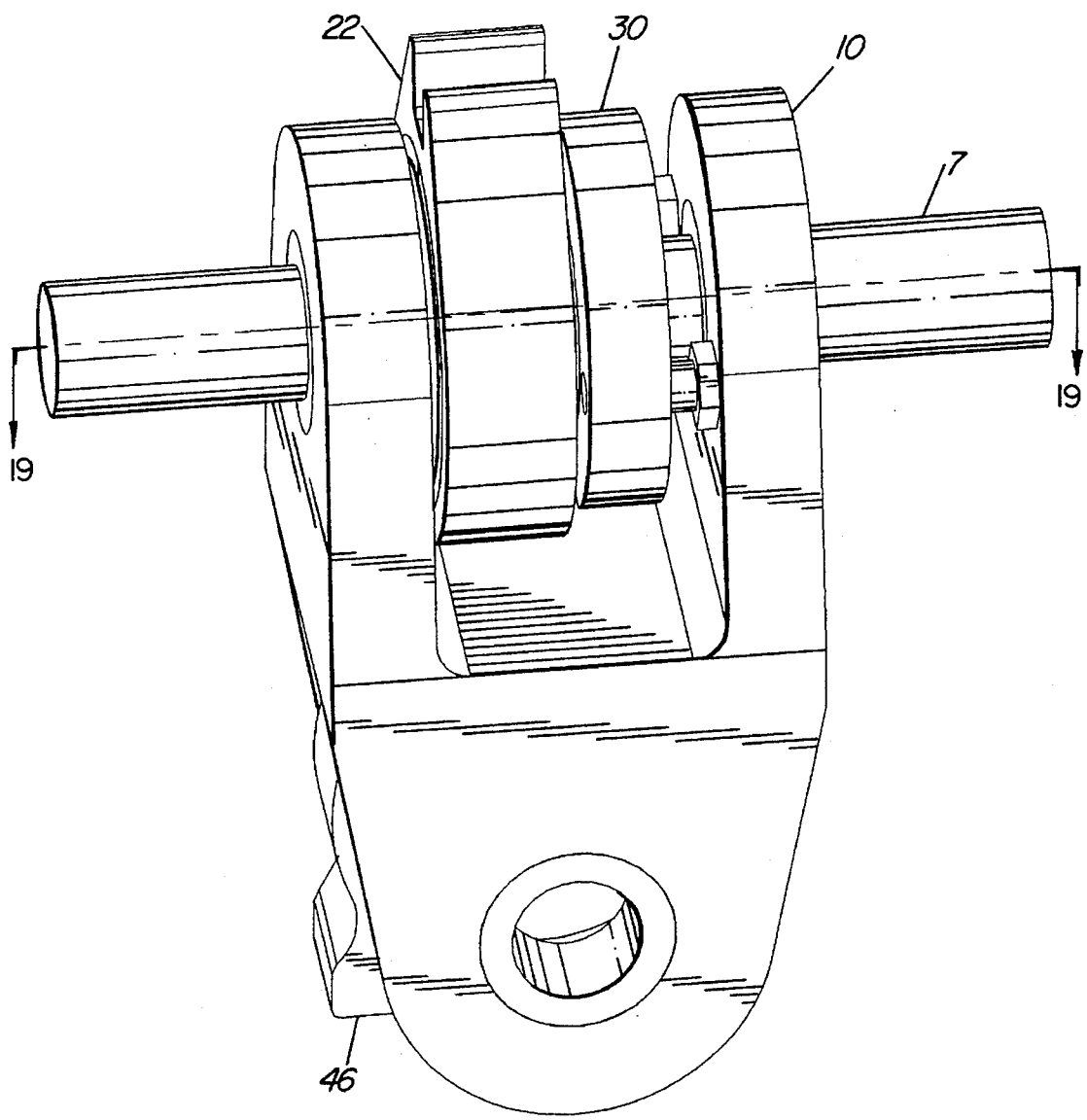
FIG. 16 is a perspective view of the third embodiment of the snubber brake assembly according to the invention.

Removal of the brake shoes 60 is carried out in the same manner as in the earlier embodiment, as illustrated in FIGS. 9, 10, 13 and 14. The saddle plate 30 is removed allowing the outer brake housing to be shifted over to the right hand side (as shown in FIG. 10) revealing the brake shoe 60 and the key stocks 52. These are removed as shown in FIG. 14 and the brake shoes 66 can be removed as well and replaced with new items. Reassembly of the outer brake housing 22, saddle plate 30, bevel washer etc. is the same as carried out in the earlier embodiments.

FIGS. 15–21

In the embodiment of the invention illustrated in FIGS. 15 through 21, the inner brake housing 70 has a pair of shear pin slots 72 machined into it and two shear pins 74 are located in the slots 72 and float therein. The brake shoes 76 each have a shear pin slot 78 machined into the inner surface thereof so that when the brake snubber is completely assembled, the shear pins 74 are held in by the inner force of the brake shoes (FIG. 20) of the pins being used to keep the brake shoes 76 from turning on the inner housing 70 because half of the shear pin is laying in the inner housing and the other half is laying in the inside surface of the brake shoe. The outer surface of the brake shoe 70 matches the inner taper of the outer housing 22 (FIG. 19) and with these two tapered surfaces being directed towards one another, it is assured that the brake shoe will be held in position by the shear pins 74 and will be forced up against the back shoulder 80 on the inner housing 70. This allows the two piece brake shoes to restrict the outer housing from turning freely.

Figure 17:
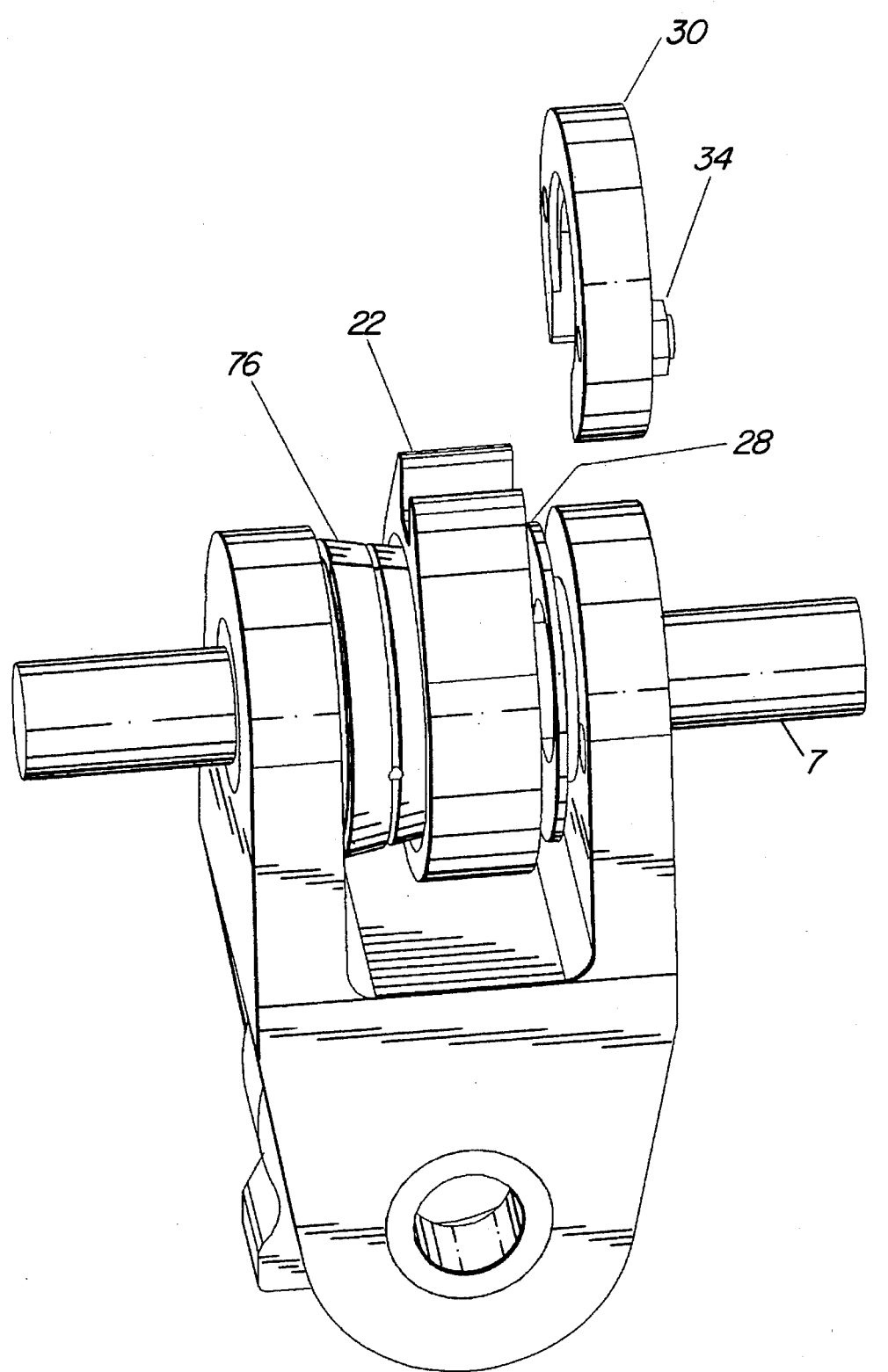
FIGS. 17 and 18 are perspective views, similar to FIGS. 10 and 11, of the third embodiment of the invention.
Figure 18:
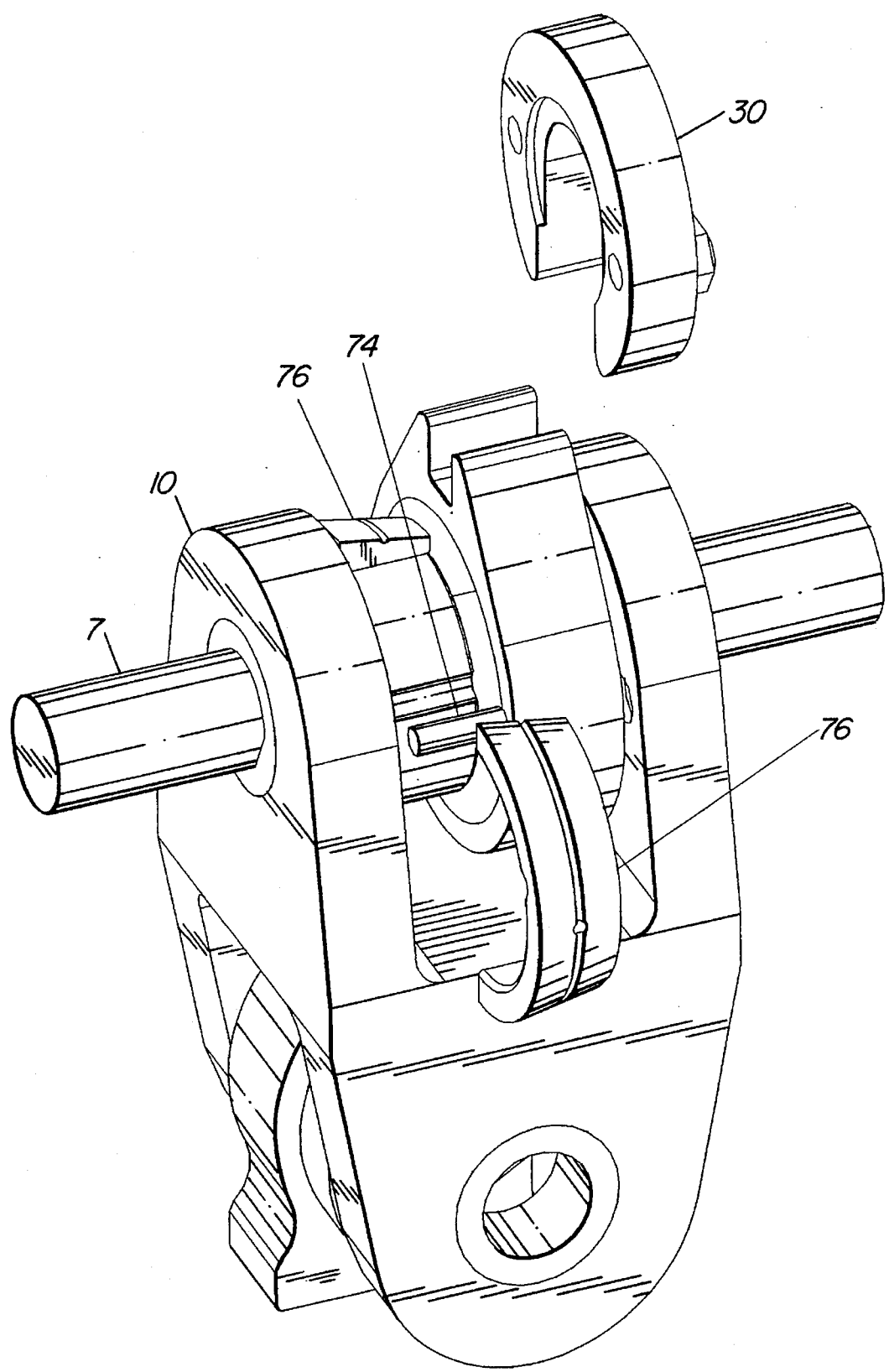
Figure 19:
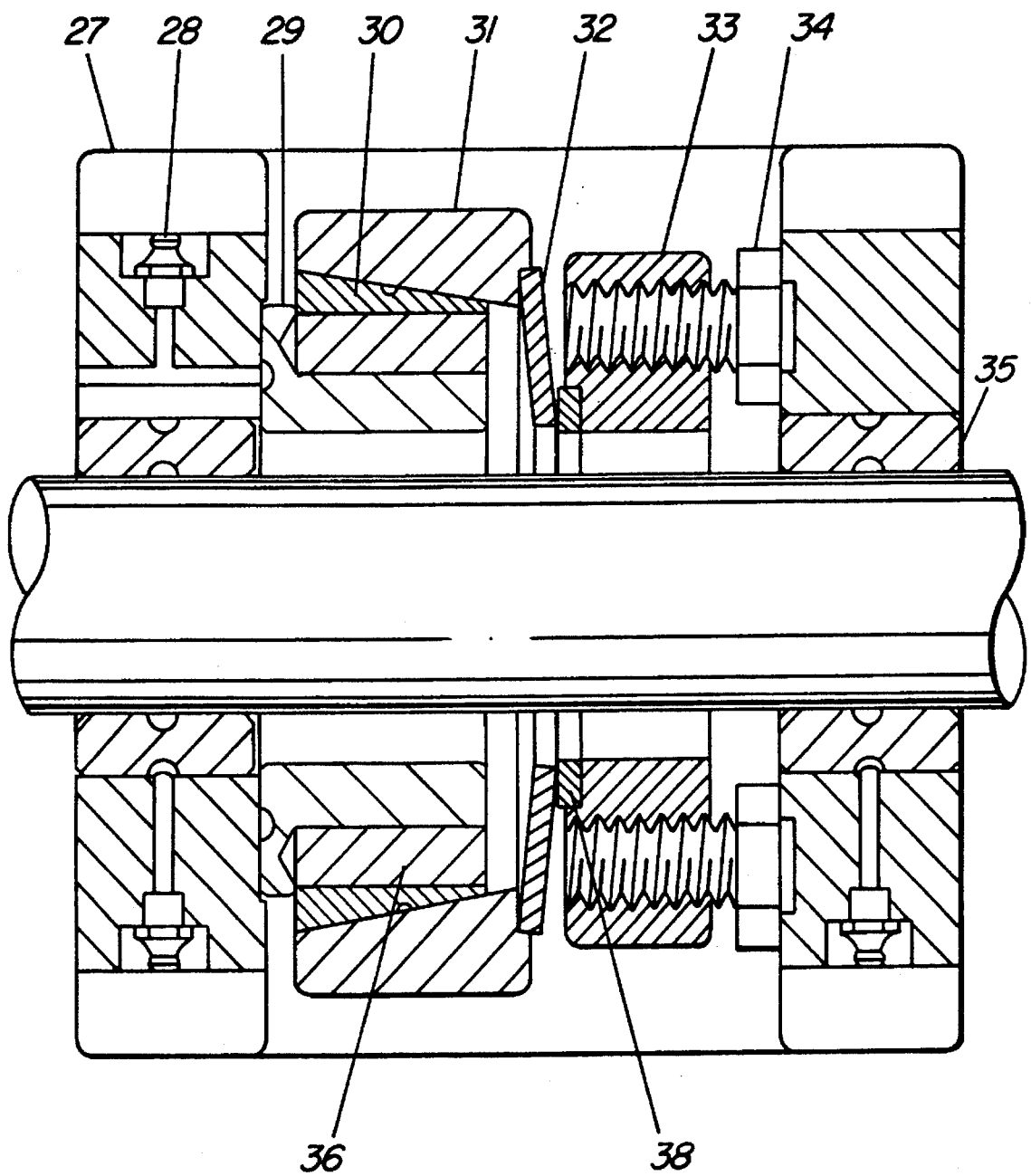
FIG. 19 is a sectional view taken along the line 19—19 of FIG. 16.
Figure 20:
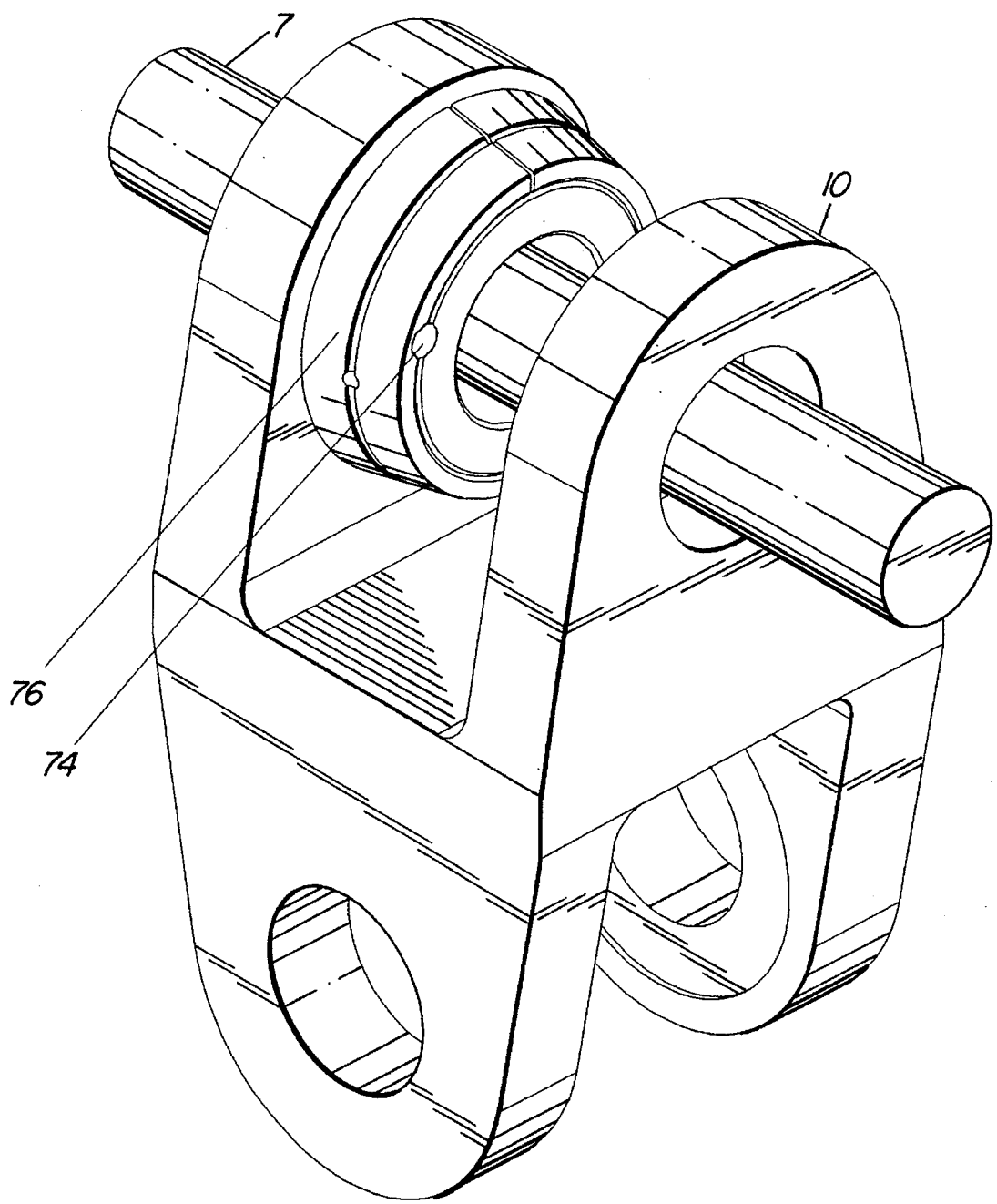
FIG. 20 is another perspective view of the third embodiment of this invention.
Figure 21:
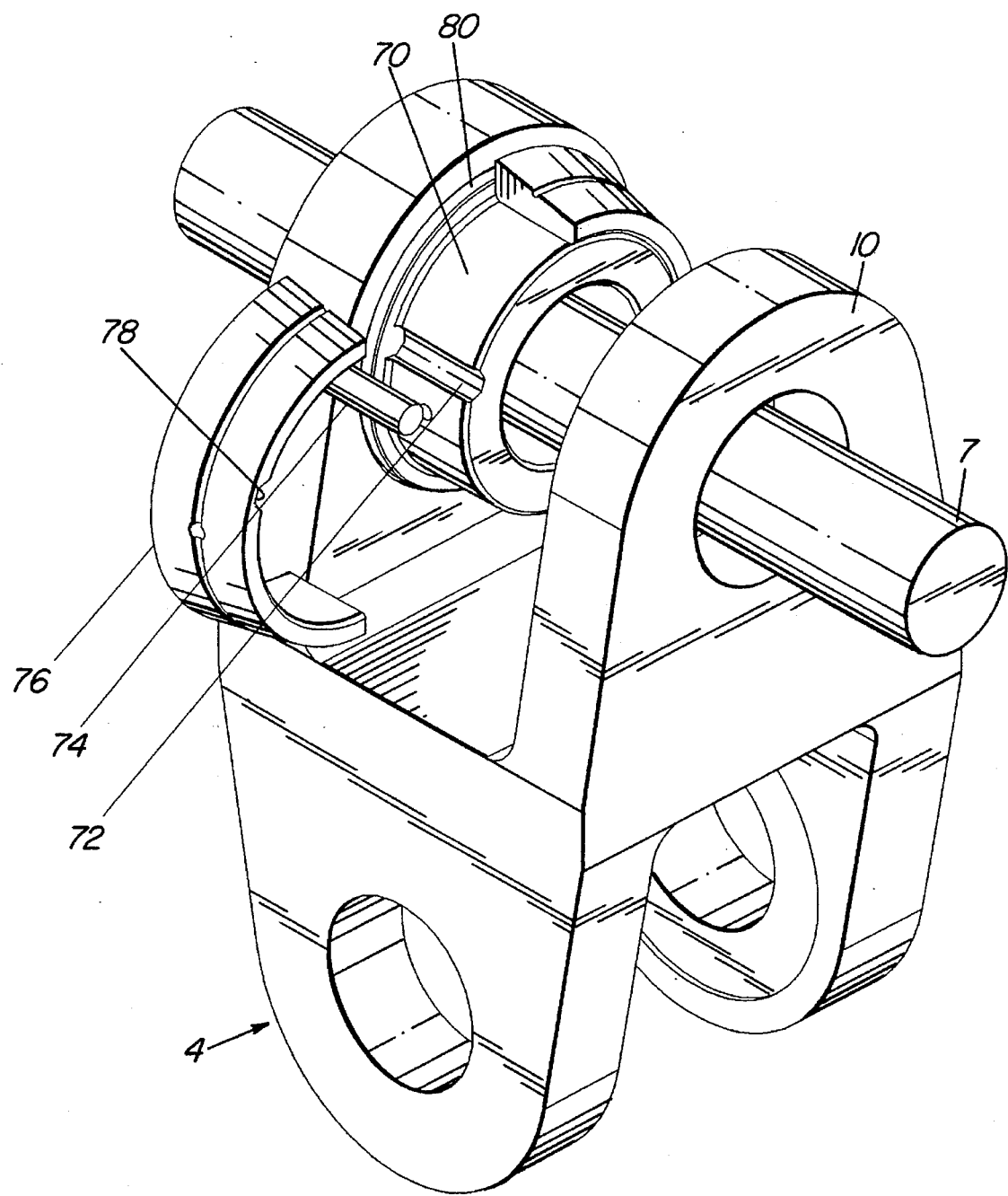
FIG. 21 is a further perspective view similar to FIG. 20 but showing elements of the brake in an exploded illustration.

Adjusting the brake in this embodiment is the same as in the two earlier embodiments and the brake subassembly can be dismantled as shown in FIGS. 17, 18 and 21 in the same manner as the earlier embodiments to replace brake shoes. The saddle ring 30 is removed from the shaft 7, allowing the outer brake housing 22 to be moved over to the right as shown in FIGS. 17 and 18. The brake shoes 76 with the shear pins 74 can be removed from the outer surface of the inner brake housing 70 and replaced with new shoes. Reassembly is carried out as described in the earlier embodiments.

The brake system in accordance with the invention is very versatile and adapted to several applications other than logging machines illustrated herein. One other area of application is in keeping ski lift chairs from swinging excessively and for keeping cable trams from excessive swinging on their supporting cables.

As in the grapple application, the brake assembly would be very easy to maintain and replace when needed on these other applications and by minimizing the effort to repair or replace the brake shells, the chances of an accident are substantially decreased.

While the invention has been described in connection with a specific embodiment thereof and in a specific use, various modifications thereof will occur to those skilled in the art without departing from the spirit and scope of the invention as set forth in the appended claims.

The terms and expression which have been employed in this specification are used as terms of description and not of limitations, and there is no intention in the use of such terms and expressions to exclude any equivalents of the features shown and described or portions thereof, but it is recognized that various modifications are possible within the scope of the invention claims.

The embodiments of the invention in which an exclusive property or privilege is claimed are defined as follows:

1. A snubber brake assembly for use with suspended, swingable bodies such as a logging machine grapple, said assembly including:

at least one pair of spaced, parallel lugs;

a pivot shaft extending through said lugs;

a brake subassembly having its components coaxially located on said pivot shaft between said lugs, said subassembly including inner and outer brake housings having matching, frusto-conical tapered surfaces directed towards one another, and brake shoes located intermediate said inner and outer housings; and means on said pivot shaft for applying an adjustable compressing force to said housings and said brake shoes therebetween, including a saddle plate straddling and removably mounted on said pivot shaft and adjustment means associated with said saddle plate for applying said compressing force on said housings and brake shoes to inhibit pivotal movement of components supported by said lugs;

said saddle plate and said brake shoes being so formed as to be removable from said pivot shaft without dismantling the complete brake subassembly and whereby the removal of said saddle plate provides for movement of selected components of the subassembly on the pivot shaft to remove, repair or replace said brake shoes.

2. A snubber brake assembly for use with suspended, swingable bodies such as a logging machine grapple, said assembly comprising:

a link having two pairs of spaced, parallel lugs, one of said pairs constituting an upper pair and being directed away, and oriented 90° from the other, lower pair thereof;

a pivot shaft extending through each pair of lugs, said shafts being oriented normal to one another;

each pivot shaft supporting a brake subassembly with an operative axis of each subassembly being normal to the other subassembly;

each subassembly having its components coaxially located on one of said pivot shafts between said lugs, each said brake subassembly comprising inner and outer brake housing having matching, frusto-conical tapered surfaces directed towards one another and brake shoes located intermediate said inner and outer housings; and means on each said pivot shaft for applying adjustable, compressing force to said housings and said brake shoes therebetween, including a saddle plate straddling and removably mounted on said pivot shaft and adjustment means associated with said saddle plate for applying said compressing force on said housings and brake shoes therebetween to inhibit pivotal movement of components supported by said lugs of said link;

said saddle plate and said brake shoes being so formed as to be removable from said pivot shaft without dismantling the complete brake subassembly and whereby the removal of said saddle plate provides for movement of selected components of the subassembly on the pivot shaft to remove, repair or replace the brake shoes.

3. A snubber brake assembly according to claim 1 wherein said outer brake housing of said brake subassembly located on the upper lugs is removably connected to an arch of an associated vehicle to prevent movement of said outer brake housing relative thereto.

4. A snubber brake assembly according to claim 2 wherein said outer brake housing of said brake subassembly located on the upper lugs is removably connected to an arch of an associated vehicle to prevent movement of said outer brake housing relative thereto.

5. A snubber brake assembly according to claim 2 wherein said outer brake housing of said brake subassembly located between the lower lugs includes means associated with said grapple to prevent swinging movement of said outer brake housing relative thereto.

6. Apparatus according to claim 1 wherein said brake shoes are located between said inner and outer brake housings in a floating arrangement.

7. Apparatus according to claim 1 wherein said brake shoes are located on said inner brake housing by means of a plurality of circumferentially spaced pin means parallel with said pivot shaft and located intermediate said brake shoes and said inner brake housing.

8. Apparatus according to claim 1 wherein said inner brake housing has a keyway machined therein with a pair of key stocks held in said keyway by retaining means, said key stocks restricting turning of said brake shoes on said inner housing.

9. Apparatus according to any one of the preceding claims wherein said brake subassembly includes spring washer means intermediate the saddle plate and said outer brake housing so as to resiliently apply axial pressure on said outer brake housing, thereby applying said compressing force between said housings, the means for axially moving said saddle plate comprising a plurality of adjusting bolts parallel to said pivot shaft and having one of their ends threadably secured in said saddle plate and the other of their ends removably located in the adjacent lug member and adjusting nut means on each of said bolts for moving said saddle plate towards or away from said spring washer means.

* * * * *